US012104687B2

(12) United States Patent
Cao

(10) Patent No.: US 12,104,687 B2
(45) Date of Patent: Oct. 1, 2024

(54) HARMONIC REDUCER WITH STRUCTURE TO PREVENT PRESSURE BUILDUP AND INDUSTRIAL ROBOT

(71) Applicant: ABB Schweiz AG, Baden (CH)

(72) Inventor: Xiaodong Cao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/007,158

(22) PCT Filed: Sep. 8, 2020

(86) PCT No.: PCT/CN2020/114056
§ 371 (c)(1),
(2) Date: Jan. 27, 2023

(87) PCT Pub. No.: WO2022/051910
PCT Pub. Date: Mar. 17, 2022

(65) Prior Publication Data
US 2023/0235815 A1 Jul. 27, 2023

(51) Int. Cl.
*F16H 57/027* (2012.01)
*B25J 9/10* (2006.01)
(Continued)

(52) U.S. Cl.
CPC .......... *F16H 57/027* (2013.01); *B25J 9/1025* (2013.01); *F16H 19/08* (2013.01);
(Continued)

(58) Field of Classification Search
CPC ...... F16H 57/027; F16H 49/001; B25J 9/1025
See application file for complete search history.

(56) References Cited

U.S. PATENT DOCUMENTS

2007/0110555 A1* 5/2007 Ono .................. F16H 21/04
414/744.5
2011/0132129 A1* 6/2011 Gao .................. B25J 9/1025
74/490.04
(Continued)

FOREIGN PATENT DOCUMENTS

CN 104061300 A 9/2014
CN 105518345 A 4/2016
(Continued)

OTHER PUBLICATIONS

International Search Report and Written Opinion; ISA/CN National Intellectual Property Administration; regarding corresponding patent application Serial No. PCT/CN2020/114056; dated Jun. 7, 2021; 10 pages.

*Primary Examiner* — Charles A Fox
*Assistant Examiner* — Gregory T Prather
(74) *Attorney, Agent, or Firm* — Greenberg Traurig, LLP

(57) ABSTRACT

A harmonic reducer includes a shaft having a first through hole extending from a first end to a second end of the shaft; a wave generator arranged on the shaft and being rotatable along with the shaft; a flexible spline arranged around the wave generator; a circular spline arranged around the flexible spline; a first flange coupled to the shaft via a first bearing and coupled to the flexible spline; and a second flange coupled to the shaft via a second bearing and coupled to the circular spline. One of the flanges is arranged near to the first end of the shaft. A cavity is provided between the one of the flanges and the first end of the shaft, such that it is in fluid communication with an external environment via the first through hole.

18 Claims, 16 Drawing Sheets

(51) Int. Cl.
*F16H 19/08* (2006.01)
*F16H 49/00* (2006.01)
*F16H 57/04* (2010.01)

(52) U.S. Cl.
CPC ....... *F16H 49/001* (2013.01); *F16H 57/0454* (2013.01); *F16H 2019/085* (2013.01)

(56) References Cited

U.S. PATENT DOCUMENTS

| | | |
|---|---|---|
| 2014/0283638 A1 | 9/2014 | Yajima |
| 2016/0305527 A1 | 10/2016 | Chuo |
| 2017/0051817 A1 | 2/2017 | Maruyama |
| 2018/0080543 A1 | 3/2018 | Kusumoto |
| 2019/0203825 A1 | 7/2019 | Yamauchi |

FOREIGN PATENT DOCUMENTS

| | | | |
|---|---|---|---|
| CN | 206874779 U | 1/2018 | |
| CN | 107856017 A | 3/2018 | |
| CN | 207715679 U | 8/2018 | |
| CN | 110094479 A | 8/2019 | |
| DE | 102019100730 A1 | 8/2019 | |
| JP | 2001304382 A | 10/2001 | |
| JP | 2017103951 A | 6/2017 | |
| WO | WO-2021081864 A1 * | 5/2021 | .............. B25J 9/102 |

* cited by examiner

HARMONIC REDUCER WITH STRUCTURE TO PREVENT PRESSURE BUILDUP AND INDUSTRIAL ROBOT

CROSS-REFERENCE TO RELATED APPLICATIONS

This is a national stage application claiming priority to International patent application Serial No.: PCT/CN2020/114056, filed on Sep. 8, 2020; which is herein incorporated by reference in its entirety.

FIELD

Embodiments of the present disclosure generally relate to the field of reducers, and more particularly, to a harmonic reducer and an industrial robot.

BACKGROUND

Harmonic reducers are widely used for driving various devices or machines, such as industrial robots, electric tools, automobiles and the like, due to small size, light weight and high precision thereof. A conventional harmonic reducer includes three basic components, i.e., a flexible spline, a circular spline, and a wave generator. During operation of the harmonic reducer, the wave generator may be rotated so as to cause the flexible spline to produce controllable elastic deformation and mesh with the circular spline. In this way, the harmonic reducer may achieve the transferring of motion and power.

Lubricant is typically provided inside the harmonic reducer so as to reduce the friction between various components of the harmonic reducer. During operation of the harmonic reducer, a high pressure may be built up in an internal space of the harmonic reducer due to various causes, such as temperature rising and vaporization of the lubricant caused by the temperature rising. The internal pressure buildup may cause the lubricant to leak out of the harmonic reducer through oil seals of the harmonic reducer. For example, in case that the harmonic reducer is utilized to drive a joint of an industrial robot, the leakage of the lubricant would degrade the lubricating performance of the harmonic reducer and contaminate the robot and work objects processed by the robot.

Conventionally, to prevent such an internal pressure buildup, a gas release hole closed by a plug may be provided on the harmonic reducer. With such an arrangement, an operator may open the plug to release the gas inside the harmonic reducer when the internal pressure of the harmonic reducer is increased. For example, the operator may open the plug to release the gas after the harmonic reducer has been preheated. However, during operation of a device including the harmonic reducer, such as the industrial robot, the operator would not be able to open the plug on the harmonic reducer to release the gas with high pressure. Moreover, the manual operation of the operator on the harmonic reducer may bring injury to the operator.

Thus, there is a need for a solution for preventing the internal pressure buildup and the lubricant leakage of the harmonic reducer.

SUMMARY

In view of the foregoing problems, various example embodiments of the present disclosure provide a harmonic reducer that can prevent both internal pressure buildup and lubricant leakage.

In a first aspect of the present disclosure, example embodiments of the present disclosure provide a harmonic reducer. The harmonic reducer comprises a shaft comprising a first through hole extending from a first end to a second end of the shaft in an axial direction of the shaft; a wave generator arranged on the shaft and being rotatable along with the shaft; a flexible spline arranged around the wave generator; a circular spline arranged around the flexible spline; a first flange coupled to the shaft via a first bearing and coupled to the flexible spline; and a second flange coupled to the shaft via a second bearing and coupled to the circular spline, wherein one of the first and second flanges is arranged near to the first end of the shaft, and wherein a cavity is provided between the one of the first and second flanges and the first end of the shaft, and is in fluid communication with an external environment via the first through hole.

In some embodiments, the harmonic reducer further comprises a porous material arranged in the first through hole.

In some embodiments, the harmonic reducer further comprises a sealing mechanism configured to selectively allow the cavity to be in fluid communication with the external environment via the first through hole in accordance with an internal pressure of the cavity.

In some embodiments, the sealing mechanism comprises: a base element coupled to the first end of the shaft and comprising a second through hole in fluid communication with the first through hole; a first sealing element arranged on the base element and comprising one or more openings and a sealing surface surrounding the one or more openings, the one or more openings being configured to communicate the cavity with the second through hole; and a second sealing element arranged between the first sealing element and the base element, and comprising an elastic sealing lip configured to contact the sealing surface of the first sealing element to block the communication between the cavity and the second through hole when the internal pressure of the cavity is below a pressure threshold and configured to be pushed away from the sealing surface of the first sealing element to communicate the cavity with the second through hole when the internal pressure of the cavity is above the pressure threshold.

In some embodiments, the base element comprises: a mounting part inserted into the first through hole at the first end of the shaft, the second through hole being provided on the mounting part; and a receiving part comprising a first receiving space, a second receiving space, and a step between the first receiving space and the second receiving space, the second receiving space being closer to the mounting part than the first receiving space.

In some embodiments, the first sealing element further comprises: a sealing part arranged in the first receiving space and supported by the step, the one or more openings and the sealing surface being provided on the sealing part; and a mounting pillar coupled to the sealing part and configured to mount the second sealing element.

In some embodiments, the second sealing element further comprises: a supporting part configured to support the elastic sealing lip and comprising a mounting hole into which the mounting pillar of the first sealing element is inserted.

In some embodiments, the base element further comprises a groove at its outer surface.

In some embodiments, the sealing mechanism comprises: a second sealing element arranged at the second end of the shaft and comprising an elastic sealing lip configured to contact the second end of the shaft to block the communication between the first through hole and the external environment when the internal pressure of the cavity is below a pressure threshold and configured to be pushed away from the second end of the shaft to communicate the first through hole with the external environment when the internal pressure of the cavity is above the pressure threshold.

In some embodiments, the second sealing element further comprises: a supporting part configured to support the elastic sealing lip and comprising a mounting hole.

In some embodiments, the harmonic reducer further comprises a pulley arranged on the shaft near to the second end of the shaft and being rotatable together with the shaft, wherein the sealing mechanism further comprises a second base element configured to support the second sealing element and comprising: a pair of mounting parts coupled to the pulley; and a second mounting pillar inserted into the mounting hole of the second sealing element to fix the supporting part of the second sealing element.

In some embodiments, the harmonic reducer further comprises one or more channels arranged between the one of the first and second flanges and corresponding one of the first and second bearings.

In some embodiments, the harmonic reducer further comprises a bearing sleeve arranged around the corresponding one of the first and second bearings.

In some embodiments, the harmonic reducer further comprises a cross roller bearing comprising an outer ring coupled to the flexible spline and an inner ring coupled to the circular spline.

In a second aspect of the present disclosure, example embodiments of the present disclosure provide an industrial robot comprising a harmonic reducer according to the first aspect of the present disclosure.

According to various embodiments of the present disclosure, the cavity inside the harmonic reducer may be in fluid communication with the external environment via the first through hole in the shaft. When the temperature of the harmonic reducer is increased, the gas inside the harmonic reducer may be released into the external environment via the first through hole, such that the internal pressure of the harmonic reducer could be maintained at a low level. In this way, the lubricant leakage via the oil seals of the harmonic reducer could be prevented effectively.

Moreover, during operation of the harmonic reducer, the rotation of the shaft would cause the lubricant (if any) adhered on the shaft to be subjected to a centrifugal force. Under the centrifugal force, the lubricant would fly away from the shaft during the high speed rotation of the shaft. In this way, the lubricant could be prevented from leaking out of the harmonic reducer via the first through hole in the shaft to a large extent.

Furthermore, according to some embodiments of the present disclosure, a sealing mechanism is provided in the harmonic reducer so as to selectively allow the cavity to be in fluid communication with the external environment via the first through hole. When the internal pressure of the cavity is below the pressure threshold, the sealing mechanism would block the communication between the cavity and the external environment. When the internal pressure of the cavity is above the pressure threshold, the sealing mechanism would allow the cavity to be in communication with the external environment. In this way, the internal pressure of the harmonic reducer could be maintained at a low level. Moreover, the lubricant may be further prevented from leaking out of the harmonic reducer via the first through hole of the shaft. Furthermore, the sealing mechanism could prevent debris in the external environment from entering the harmonic reducer via the first through hole.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
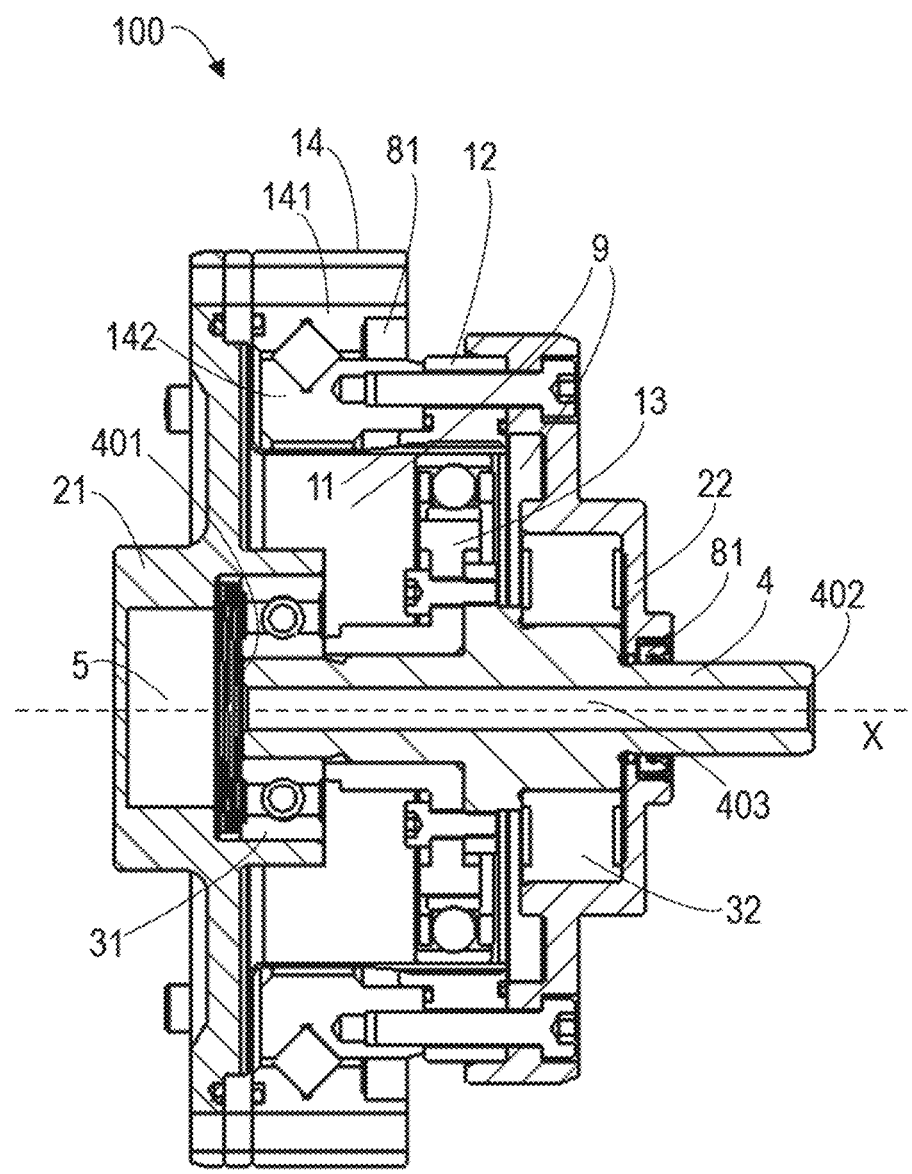
FIG. 1 illustrates a cross-sectional view of a harmonic reducer in accordance with a first embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As discussed above, the internal pressure buildup of the harmonic reducer may cause the lubricant to leak out of the harmonic reducer through the oil seals. According to embodiments of the present disclosure, to prevent both internal pressure buildup and lubricant leakage of the harmonic reducer, a through hole is provided in the shaft of the harmonic reducer such that the cavity in the harmonic reducer may be in fluid communication with the external environment. The above idea may be implemented in various manners, as will be described in detail in the following paragraphs.

Hereinafter, the principles of the present disclosure will be described in detail with reference to FIGS. 1-16. Referring to FIG. 1 first, FIG. 1 illustrates a cross-sectional view of a harmonic reducer in accordance with a first embodiment of the present disclosure. As shown in FIG. 1, the harmonic reducer 100 generally includes a shaft 4, a wave generator 13, a flexible spline 11, a circular spline 12, a first flange 21, and a second flange 22.

The shaft 4 is an input shaft of the harmonic reducer 100 and is adapted to receive a drive power (torque) input from a driver, such as a motor. As shown in FIG. 1, the shaft 4 includes a first end 401 and a second end 402 opposite to the first end 401. The first end 401 is arranged inside the harmonic reducer 100 and the second end 402 is arranged outside the harmonic reducer 100. The shaft 4 is provided with a first through hole 403 extending from the first end 401 to the second end 402 of the shaft 4 in an axial direction X of the shaft 4.

The wave generator 13 is arranged on the shaft 4 and is rotatable along with the shaft 4. That is, the wave generator 13 may rotate in synchronization with the shaft 4. The flexible spline 11 is arranged around the wave generator 13. The circular spline 12 is arranged around the flexible spline 11. During operation of the harmonic reducer 100, the wave generator 13 may be rotated so as to cause the flexible spline 11 to produce controllable elastic deformation and mesh with the circular spline 12. The number of teeth of the circular spline 12 is more than the number of teeth of the flexible spline 11 by two. With such an arrangement, the harmonic reducer 100 may achieve the transferring of motion and power. It is noted that the constructions and operating principles of the wave generator 13, the flexible spline 11, and the circular spline 12 are known in the art, and will not be described in detail any more herein.

The first flange 21 is coupled to the shaft 4 via a first bearing 31. The second flange 22 is coupled to the shaft 4 via a second bearing 32. With such an arrangement, the shaft 4 may be supported by the first flange 21 and the second flange 22. In addition, the first flange 21 is further coupled to the flexible spline 11 and the second flange 22 is further coupled to the circular spline 12. During operation of the harmonic reducer 100, the flexible spline 11 may rotate in synchronization with the first flange 21 at a low speed, and the circular spline 12 and the second flange 22 would not rotate.

In the first embodiment, as shown in FIG. 1, the first end 401 of the shaft 4 is arranged inside the harmonic reducer 100 and near to the first flange 21. A cavity 5 is provided between the first flange 21 and the first end 401 of the shaft 4. The cavity 5 is in fluid communication with internal spaces 9 of the harmonic reducer 100 via for example gaps on the first bearing 31. Thus, the cavity 5 and the internal spaces 9 of the harmonic reducer 100 may be at substantially the same pressure. Further, the cavity 5 is in fluid communication with the external environment via the first through hole 403. If the pressure inside the harmonic reducer 100 is increased due to for example the temperature rising, the gas inside the harmonic reducer 100 may be released into the external environment via the first through hole 403.

To reduce the friction between various components of the harmonic reducer 100, lubricant is typically provided in the internal spaces 9 of the harmonic reducer 100. During operation of the harmonic reducer 100, if the temperature of the harmonic reducer 100 rises, the gas in the internal spaces 9 may be released into the cavity 5 and then into the external environment via the first through hole 403, such that the pressure of the internal spaces 9 could be maintained at a low level. In this way, the lubricant leakage via oil seals 81 of the harmonic reducer 100 could be prevented effectively.

Moreover, during operation of the harmonic reducer 100, the rotation of the shaft 4 would cause the lubricant (if any) adhered on the shaft 4 to be subjected to a centrifugal force. Under the centrifugal force, the lubricant would fly away from the shaft 4 during the high speed rotation of the shaft 4. In this way, the lubricant could be prevented from leaking out of the harmonic reducer 100 via the first through hole 403 to a large extent.

In the first embodiment, as shown in FIG. 1, the harmonic reducer 100 further includes a cross roller bearing 14. The cross roller bearing 14 includes an outer ring 141 coupled to the flexible spline 11 and an inner ring 142 coupled to the circular spline 12. In other embodiments, the cross roller bearing 14 may be replaced by other types of bearings. The scope of the present disclosure is not intended to be limited in this respect.

Figure 2:
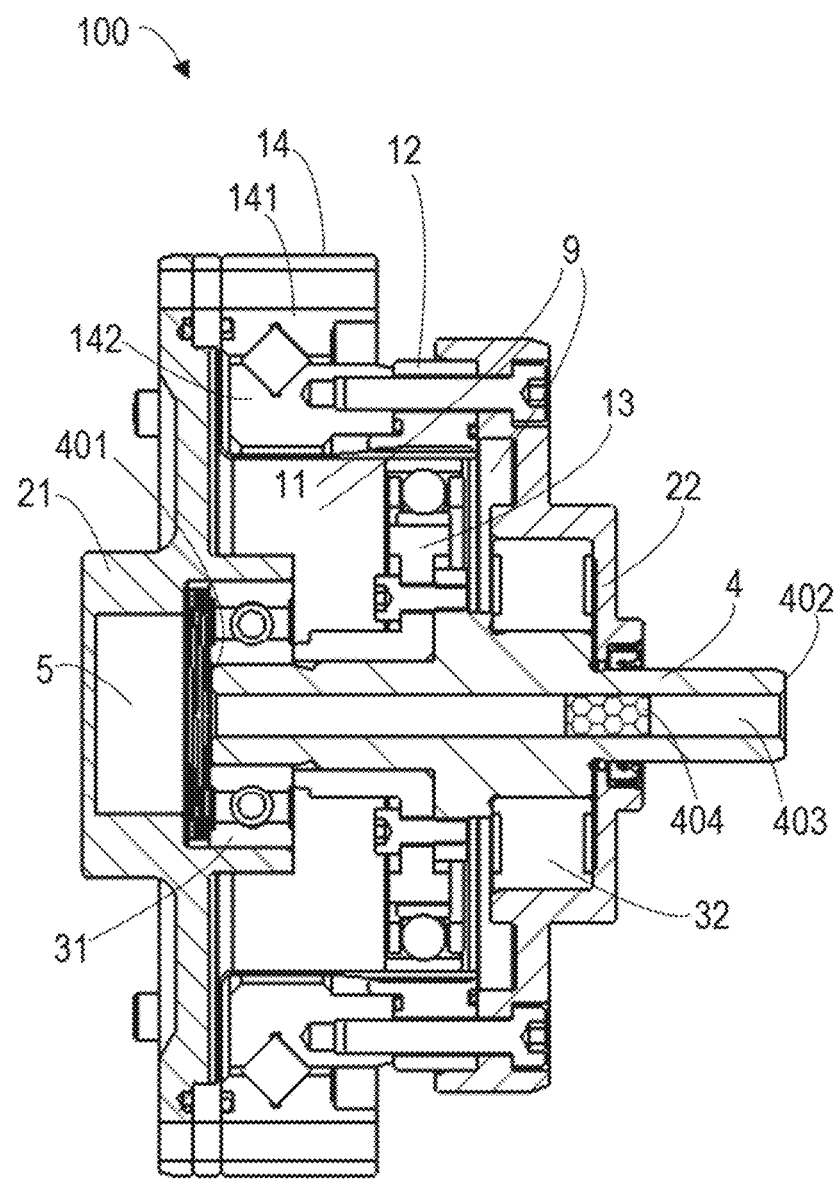
FIG. 2 illustrates a cross-sectional view of a harmonic reducer in accordance with a second embodiment of the present disclosure.

FIG. 2 illustrates a cross-sectional view of a harmonic reducer in accordance with a second embodiment of the present disclosure. The construction of the harmonic reducer 100 as shown in FIG. 2 is similar to that of the harmonic reducer 100 as shown in FIG. 1, except that the harmonic reducer 100 as shown in FIG. 2 further includes a porous material 404 arranged in the first through hole 403. The porous material 404 is permeable to the gas and non-permeable to the lubricant. Hence, the porous material 404 may adsorb the lubricant mixed in the gas from the cavity 5 on one hand, and may prevent debris in the external environment from entering the cavity 5 via the first through hole 403 on the other hand.

Figure 3:
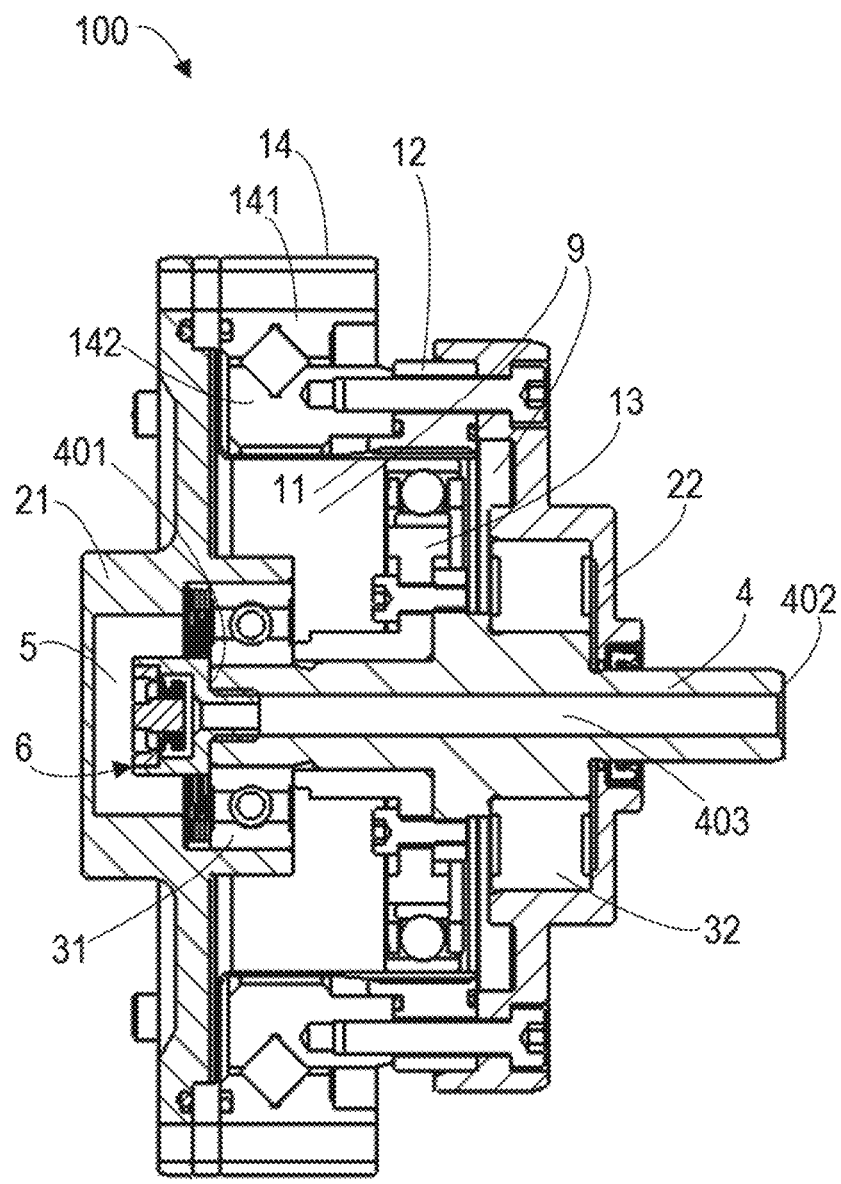
FIG. 3 illustrates a cross-sectional view of a harmonic reducer in accordance with a third embodiment of the present disclosure.

FIG. 3 illustrates a cross-sectional view of a harmonic reducer in accordance with a third embodiment of the present disclosure. The construction of the harmonic reducer 100 as shown in FIG. 3 is similar to that of the harmonic reducer 100 as shown in FIG. 1, except that the harmonic reducer 100 as shown in FIG. 3 further includes a sealing mechanism 6. The sealing mechanism 6 is configured to selectively allow the cavity 5 to be in fluid communication with the external environment in accordance with an internal pressure of the cavity 5. When the internal pressure of the cavity 5 is increased due to the temperature rising of the harmonic reducer 100, the sealing mechanism 6 may allow the cavity 5 to be in communication with the external environment. On the contrary, when the internal pressure of the cavity 5 is substantially identical to the environment pressure, the sealing mechanism 6 may block the communication between the cavity 5 and the external environment.

Figure 4:
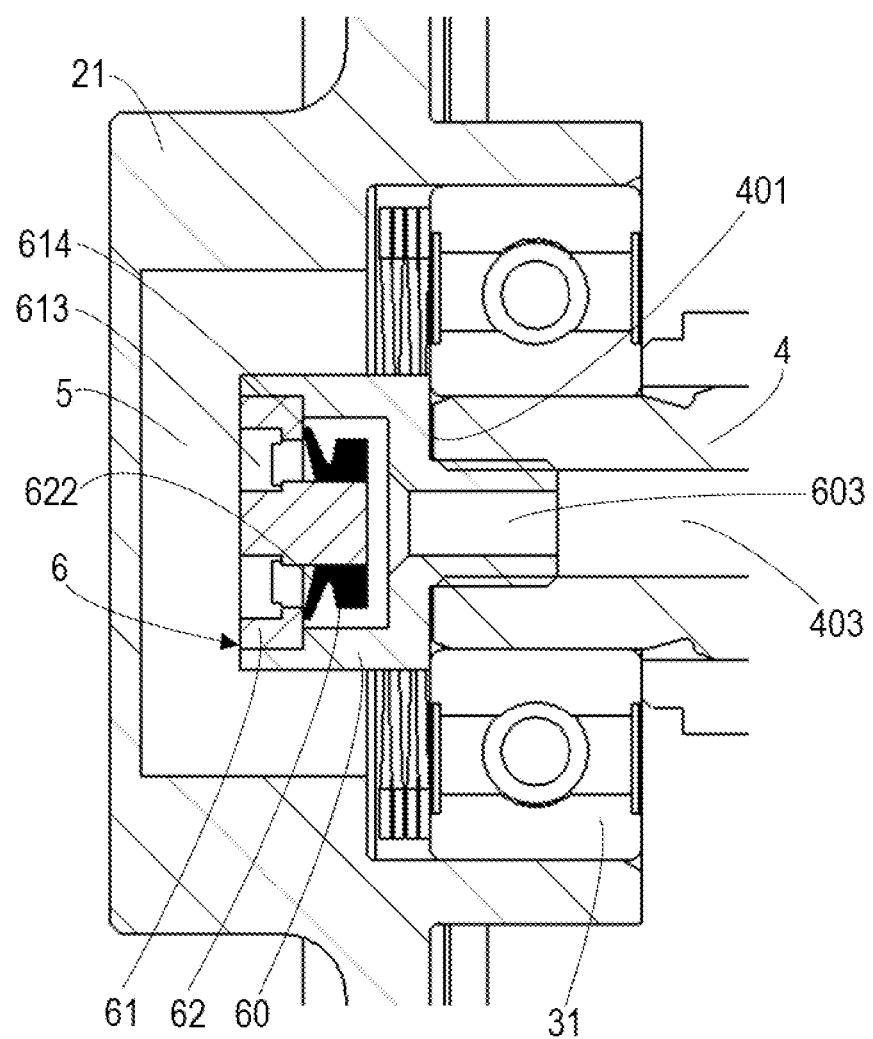
FIG. 4 is a partially enlarged view of the harmonic reducer as shown in FIG. 3.
Figure 5:
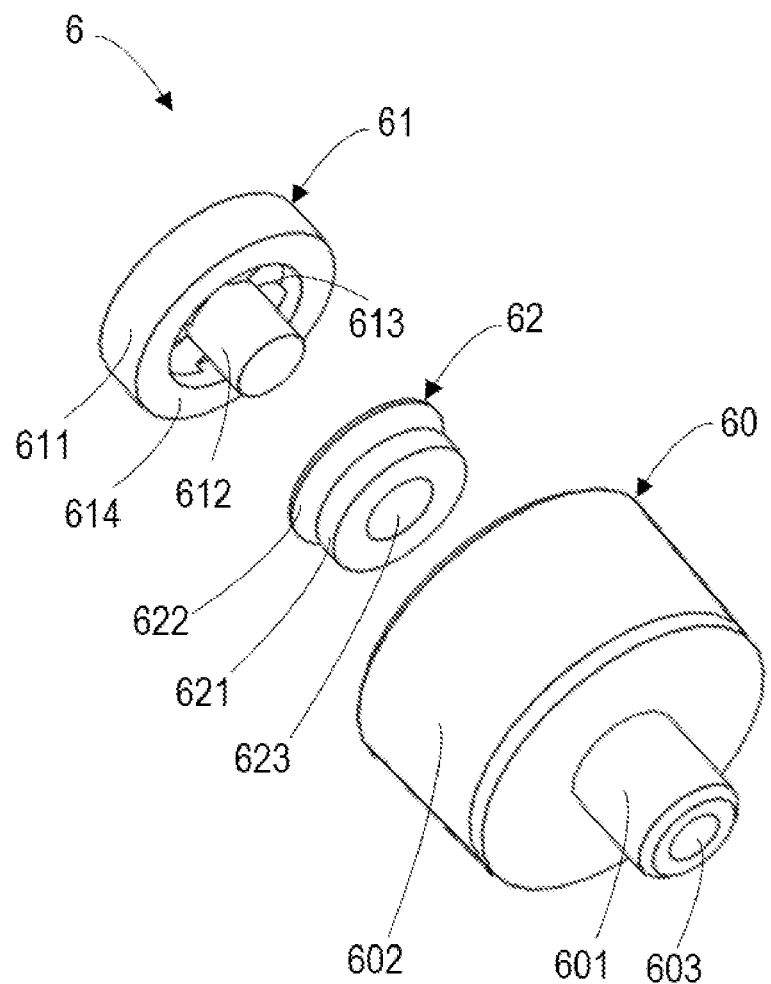
FIG. 5 is an exploded view of a sealing mechanism of the harmonic reducer as shown in FIG. 3.
Figure 6:
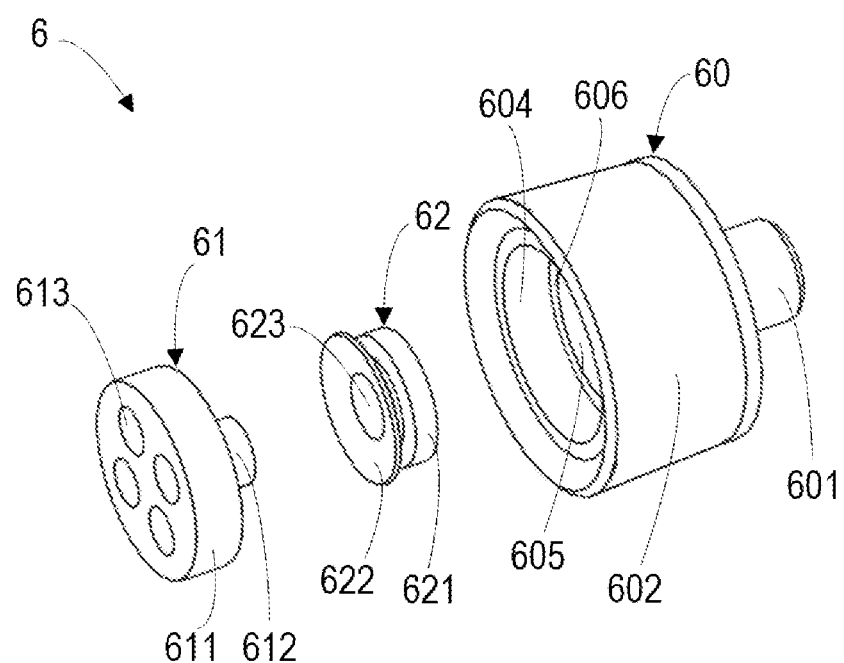
FIG. 6 is an exploded view of the sealing mechanism as shown in FIG. 5 when viewed in another direction.

The sealing mechanism 6 may have various constructions. FIGS. 4-6 illustrate an example construction and arrangement of the sealing mechanism 6. As shown in FIGS. 4-6, the sealing mechanism 6 includes a base element 60, a first sealing element 61, and a second sealing element 62.

As shown in FIGS. 4-6, the base element 60 is arranged at the first end 401 of the shaft 4 and adapted to support the first and second sealing elements 61, 62. In some cases, the base element 60 may be detachably mounted onto the shaft 4, for example through screws or in other manners. In other cases, the base element 60 may be soldered on the first end 401 of the shaft 4 or even formed as a part of the shaft 4.

In some embodiments, as shown in FIGS. 5 and 6, the base element 60 includes a mounting part 601 adapted to be mounted onto the shaft 4 and a receiving part 602 adapted to receive the first and second sealing elements 61, 62. The mounting part 601 is provided with a second through hole 603 in fluid communication with the first through hole 403. The mounting part 601 may be inserted into the first through hole 403 of the shaft 4, and coupled to the shaft 4 through screws or interference fit, or in various other manners. The receiving part 602 includes a first receiving space 604, a second receiving space 605, and a step 606 between the first receiving space 604 and the second receiving space 605. The second receiving space 605 is in fluid communication with the second through hole 603, and in turn, in fluid communication with the first through hole 403. The second receiving space 605 is closer to the mounting part 601 than the first receiving space 604. That is, the second receiving space 605 is disposed at a lower portion of the receiving part 602, and the first receiving space 604 is disposed at an upper portion of the receiving part 602. The first and second sealing elements 61, 62 are arranged in the first and second receiving spaces 604, 605, as will be described in detail hereinafter.

As shown in FIGS. 4-6, the first sealing element 61 is arranged on the base element 60 and includes one or more openings 613 and a sealing surface 614 surrounding the one or more openings 613. The one or more openings 613 are configured to communicate the cavity 5 with the second through hole 603. The sealing surface 614 is configured to cooperate with the second sealing element 62. When the sealing surface 614 is in contact with the second sealing element 62, the one or more openings 613 would be closed, and when the sealing surface 614 is not in contact with the second sealing element 62, the one or more openings 613 would be opened.

In some embodiments, as shown in FIGS. 4-6, the first sealing element 61 includes a sealing part 611 and a mounting pillar 612. The sealing part 611 is arranged in the first receiving space 604 and supported by the step 606. The sealing part 611 may be adhered onto the receiving part 602 or fixed in the first receiving space 604 through interference fit. The one or more openings 613 and the sealing surface 614 are provided on the sealing part 611. The sealing surface 614 is a part of a bottom surface of the sealing part 611. The mounting pillar 612 is adapted to mount the second sealing element 62.

As shown in FIGS. 4-6, the second sealing element 62 is arranged between the first sealing element 61 and the base element 60 so as to selectively allow or block the fluid communication between the cavity 5 and the first through hole 403 of the shaft 4. The second sealing element 62 is generally located in the second receiving space 605. To cooperate with the sealing surface 614 of the first sealing element 61, the second sealing element 62 includes an elastic sealing lip 622. The elastic sealing lip 622 is configured to contact the sealing surface 614 of the first sealing element 61 to block the communication between the cavity 5 and the second through hole 603 when the internal pressure of the cavity 5 is below a pressure threshold and configured to be pushed away from the sealing surface 614 of the first sealing element 61 to communicate the cavity 5 with the second through hole 603 when the internal pressure of the cavity 5 is above the pressure threshold.

In some embodiments, as shown in FIGS. 4-6, the elastic sealing lip 622 is formed on a supporting part 621. The supporting part 621 is configured to support the elastic sealing lip 622 and includes a mounting hole 623 into which the mounting pillar 612 of the first sealing element 61 is inserted. Through the cooperation between the mounting pillar 612 and the mounting hole 623, the second sealing element 62 may be coupled onto the first sealing element 61 easily and reliably.

In some embodiments, the second sealing element 62 may be made of rubber material or other elastic materials as a whole. In some other embodiments, only the elastic sealing lip 622 is made of rubber material or other elastic materials, and the elastic sealing lip 622 is coupled to the supporting part 621 of a different material.

According to embodiments of the present disclosure, the sealing mechanism 6 may provide additional advantages. On one hand, the internal pressure of the harmonic reducer 100 could be maintained at a low level. On the other hand, through the cooperation between the sealing surface 614 of the first sealing element 61 and the elastic sealing lip 622 of the second sealing element 62, the openings 613 on the first sealing element 61 may be blocked most of the time. Thus, the lubricant may be further prevented from leaking out of the harmonic reducer 100 via the first through hole 403 of the shaft 4, and the sealing mechanism 6 could prevent debris in the external environment from entering the harmonic reducer 100 via the first through hole 403.

Figure 7:
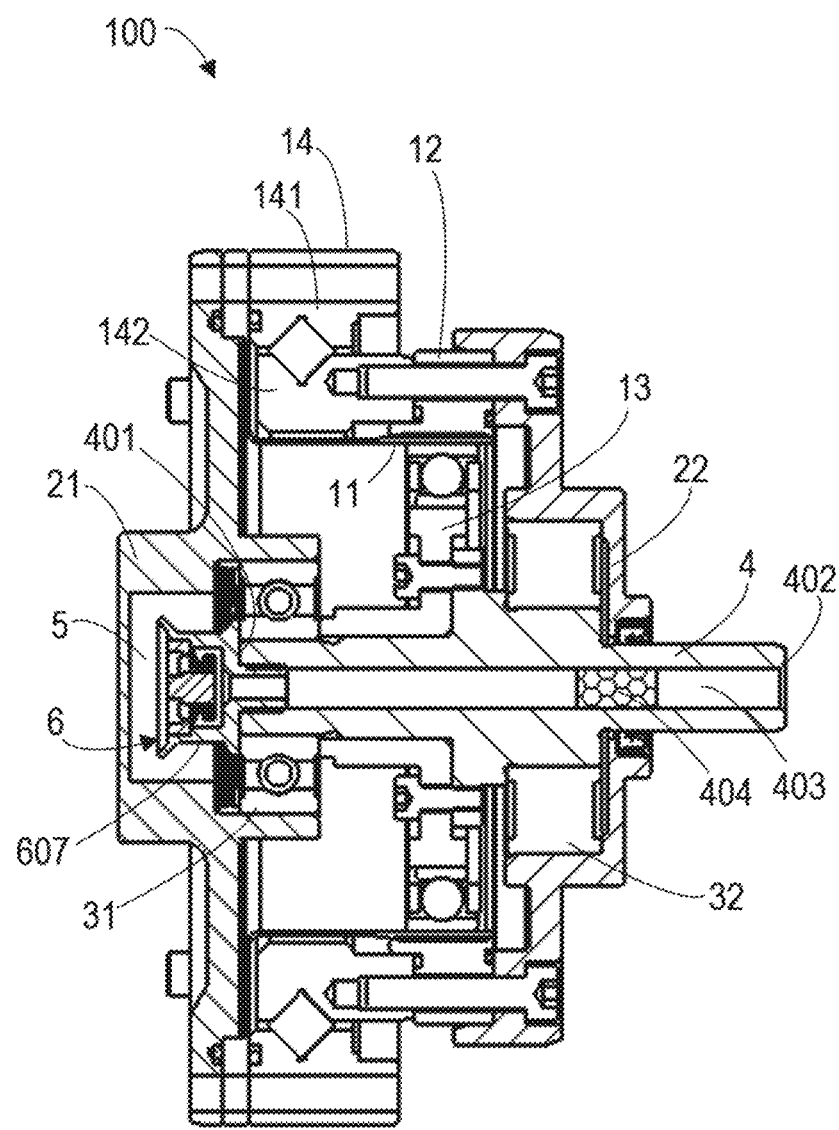
FIG. 7 illustrates a cross-sectional view of a harmonic reducer in accordance with a fourth embodiment of the present disclosure.
Figure 8:
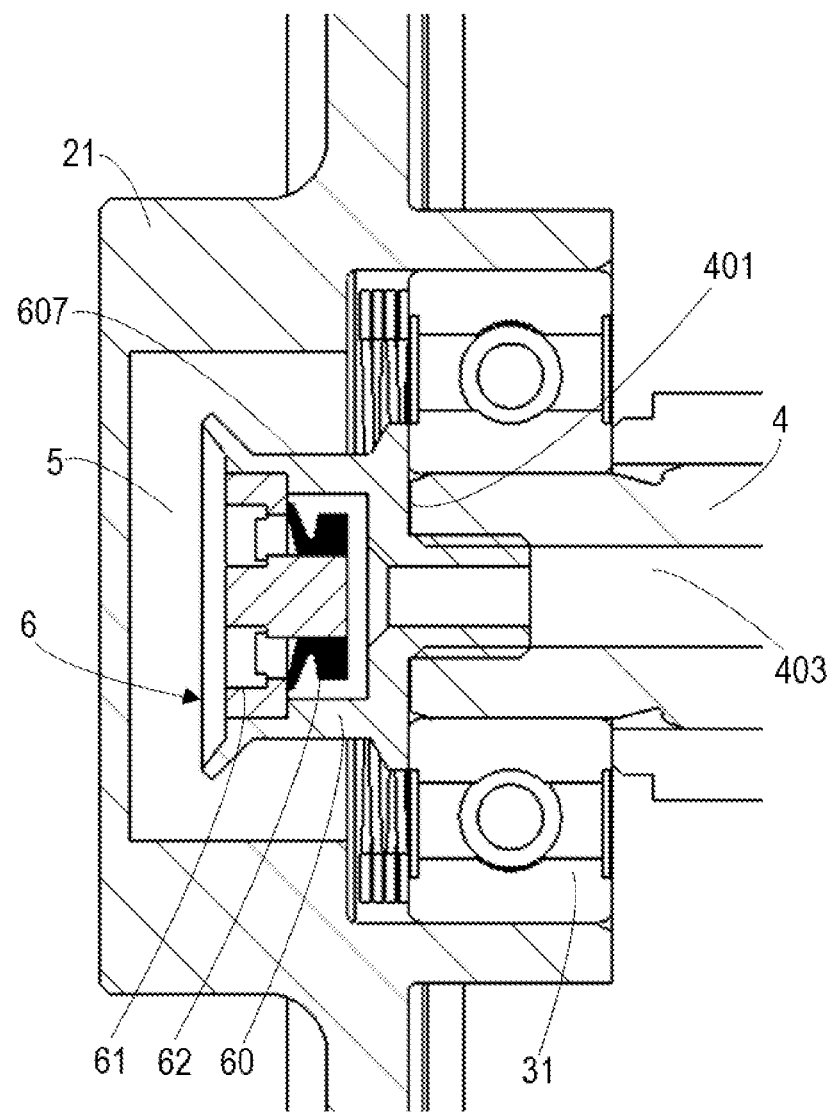
FIG. 8 is a partially enlarged view of the harmonic reducer as shown in FIG. 7.
Figure 9:
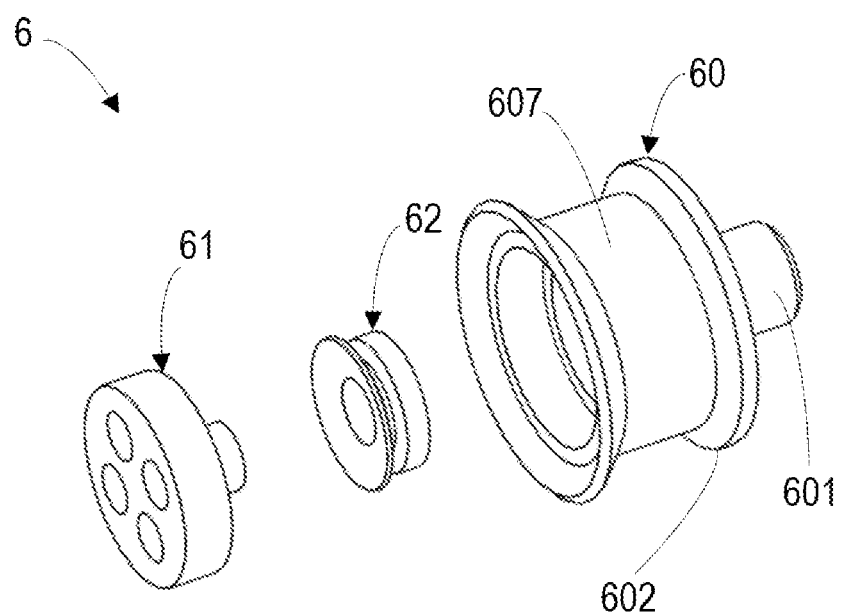
FIG. 9 is an exploded view of a sealing mechanism of the harmonic reducer as shown in FIG. 7.

FIG. 7 illustrates a cross-sectional view of a harmonic reducer in accordance with a fourth embodiment of the present disclosure. The construction of the harmonic reducer 100 as shown in FIG. 7 is similar to that of the harmonic reducer 100 as shown in FIG. 3, except that the base element 60 further includes a groove 607 at its outer surface. FIGS. 8 and 9 illustrate details of the groove 607. As shown, the groove 607 is arranged at an outer surface of the receiving part 602 of the base element 60. The groove 607 includes a bottom surface and two oblique sidewalls. The oblique sidewalls of the groove 607 would cause the lubricant adhered on the base element 60 to fly away from the base element 60 more easily.

Figure 10:
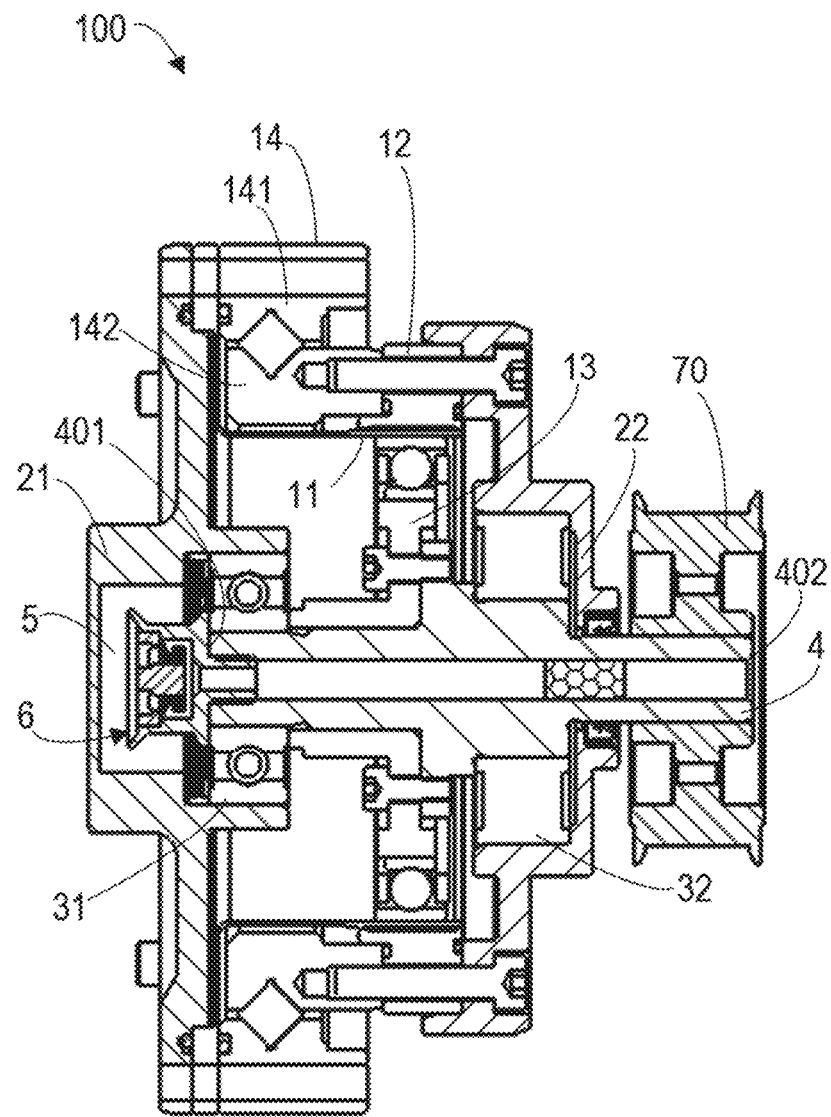
FIG. 10 illustrates a cross-sectional view of a harmonic reducer in accordance with a fifth embodiment of the present disclosure.

FIG. 10 illustrates a cross-sectional view of a harmonic reducer in accordance with a fifth embodiment of the present disclosure. The construction of the harmonic reducer 100 as shown in FIG. 10 is similar to that of the harmonic reducer 100 as shown in FIG. 7, except that the harmonic reducer 100 as shown in FIG. 10 further includes a pulley 70 arranged on the shaft 4. The pulley 70 is positioned near to the second end 402 of the shaft 4 and rotatable together with the shaft 4. Through the pulley 70, the shaft 4 of the harmonic reducer 100 may be driven by a driver via a belt.

Figure 11:
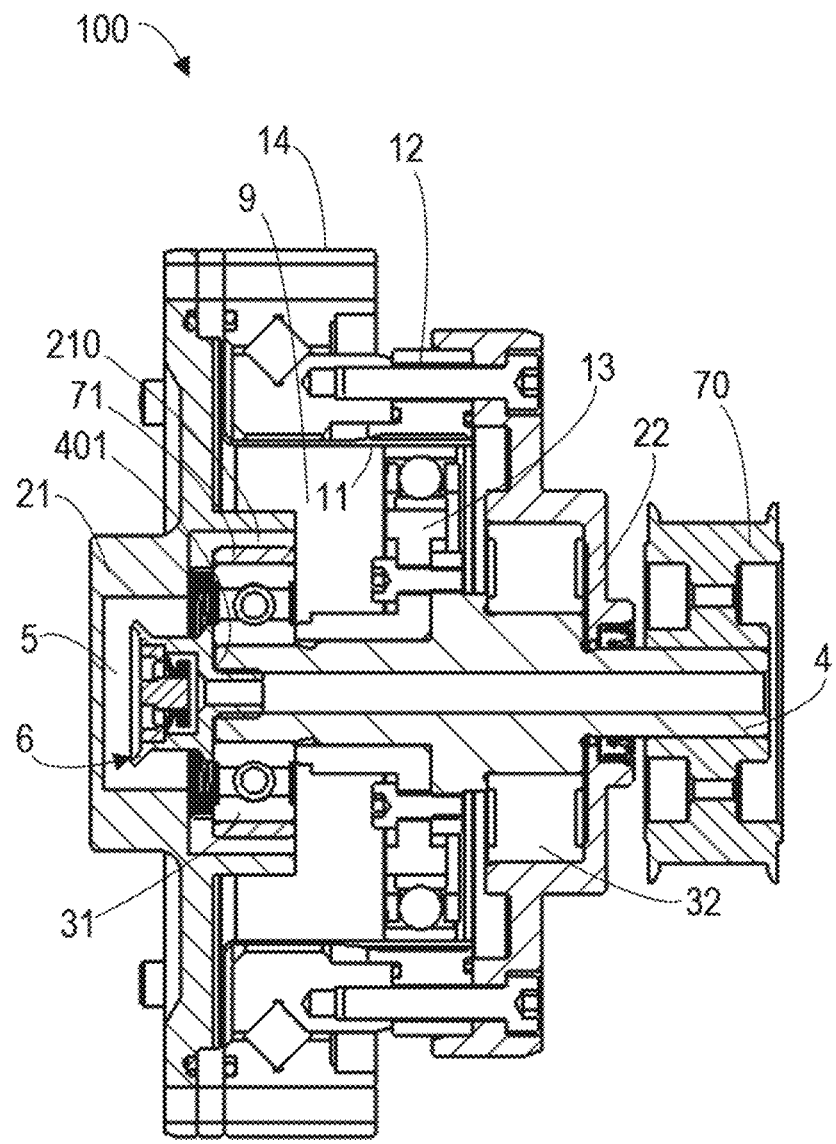
FIG. 11 illustrates a cross-sectional view of a harmonic reducer in accordance with a sixth embodiment of the present disclosure.
Figure 12:
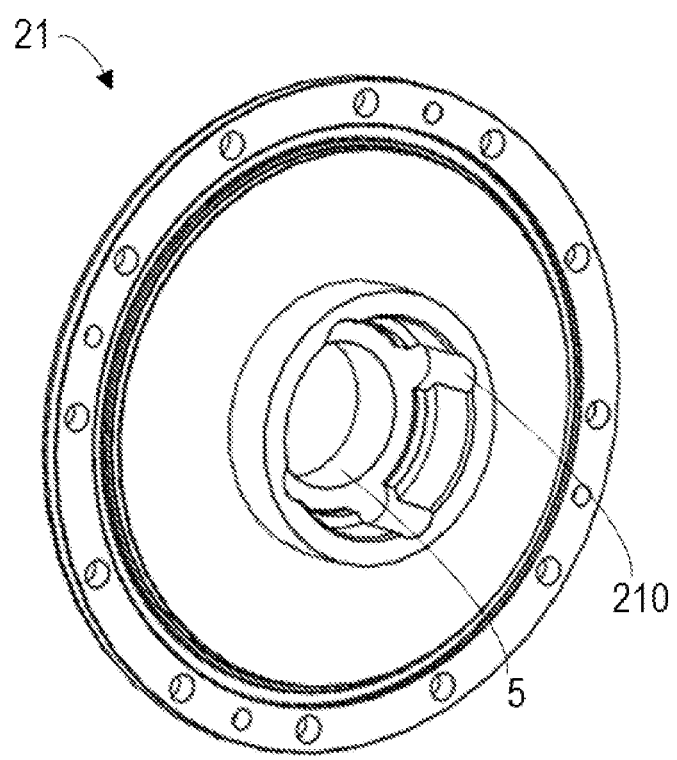
FIG. 12 is a perspective view of a first flange of the harmonic reducer as shown in FIG. 11.
Figure 13:
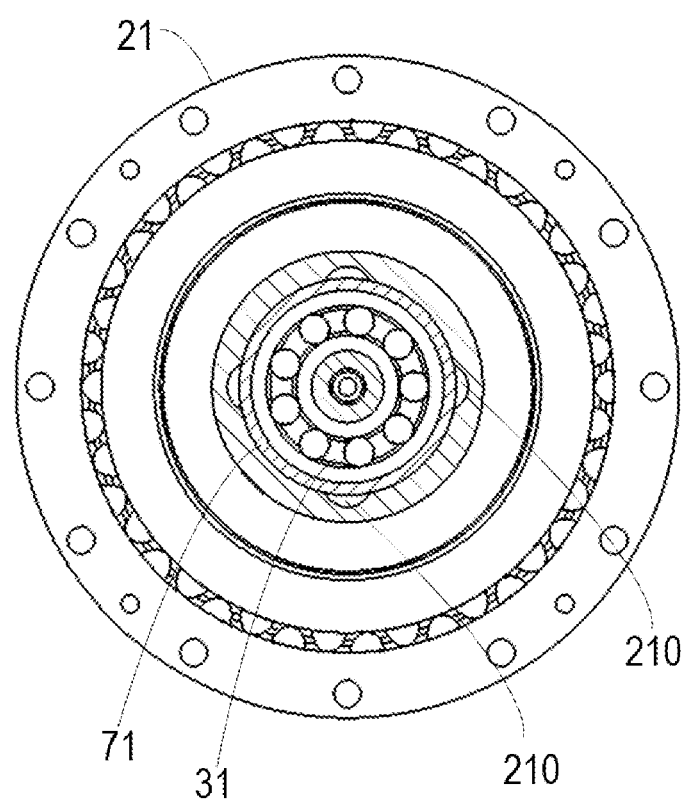
FIG. 13 illustrates a relative arrangement between the first flange and the first bearing of the harmonic reducer as shown in FIG. 11.

In some cases, a large amount of lubricant would probably accumulate in the cavity 5. In order to remove the lubricant in the cavity 5, one or more channels may be provided between the cavity 5 and the internal spaces 9. FIGS. 11-13 illustrate an example approach for removing the lubricant in the cavity 5.

FIG. 11 illustrates a cross-sectional view of a harmonic reducer in accordance with a sixth embodiment of the present disclosure, FIG. 12 is a perspective view of the first flange of the harmonic reducer as shown in FIG. 11, and FIG. 13 illustrates a relative arrangement between the first flange and the first bearing of the harmonic reducer as shown in FIG. 11. The construction of the harmonic reducer 100 as shown in FIG. 11 is similar to that of the harmonic reducer 100 as shown in FIG. 10, except that the harmonic reducer 100 further includes one or more channels 210 arranged between the first flange 21 and the first bearing 31. Through the channels 210, the lubricant in the cavity 5 may flow back into the internal spaces 9.

In some embodiments, as shown in FIGS. 11-13, the harmonic reducer 100 further includes a bearing sleeve 71 arranged around the first bearing 31. The bearing sleeve 71 may protect the first bearing 31 from being worn by the first flange 21.

Figure 14:
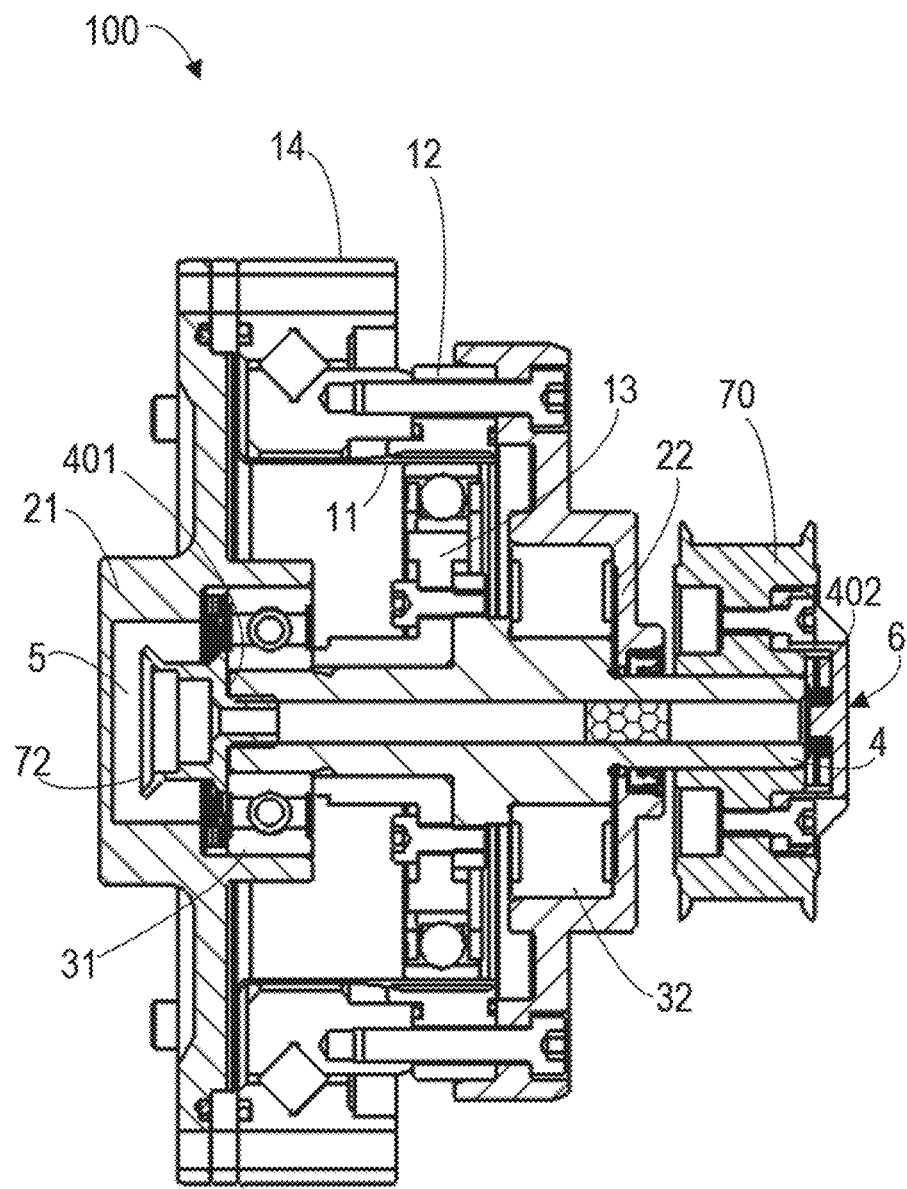
FIG. 14 illustrates a cross-sectional view of a harmonic reducer in accordance with a seventh embodiment of the present disclosure.
Figure 15:
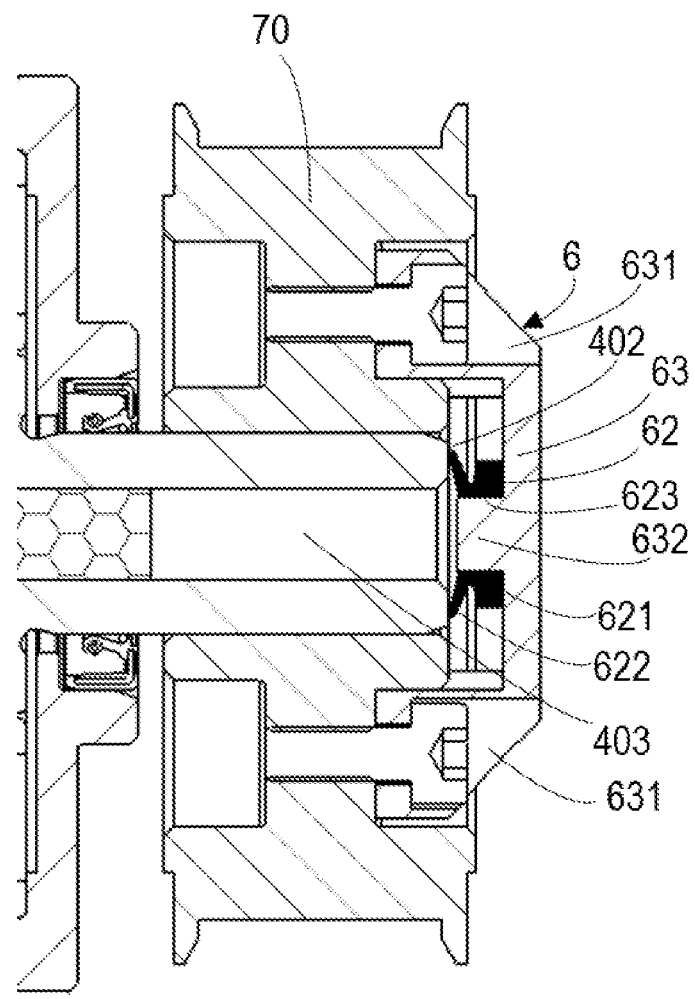
FIG. 15 is a partially enlarged view of the harmonic reducer as shown in FIG. 14.
Figure 16:
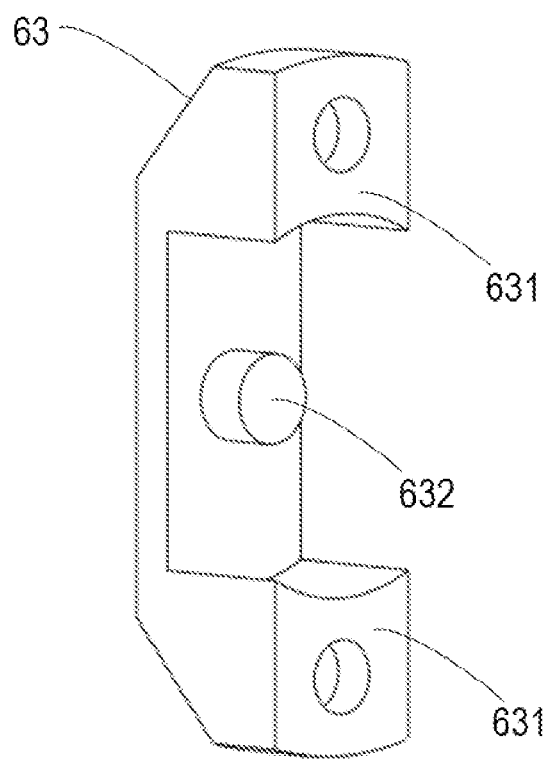
FIG. 16 is a perspective view of a second base element of the harmonic reducer as shown in FIG. 14.

FIG. 14 illustrates a cross-sectional view of a harmonic reducer in accordance with a seventh embodiment of the present disclosure, FIG. 15 is a partially enlarged view of the harmonic reducer as shown in FIG. 14, and FIG. 16 is a perspective view of a second base element of the harmonic reducer as shown in FIG. 14. The construction of the harmonic reducer 100 as shown in FIG. 14 is similar to that of the harmonic reducer 100 as shown in FIG. 10, except that the sealing mechanism 6 as shown in FIG. 14 is of a different structure and is arranged at a different position.

As shown in FIGS. 14 and 15, the sealing mechanism 6 includes a second sealing element 62. The construction of the second sealing element 62 as shown in FIGS. 14 and 15 is similar to that of the second sealing element 62 as shown in FIGS. 4-6. For example, the second sealing element 62 includes an elastic sealing lip 622 and a supporting part 621 adapted to support the elastic sealing lip 622. The elastic sealing lip 622 is configured to contact the second end 402 of the shaft 4 to block the communication between the first through hole 403 and the external environment when the internal pressure of the cavity 5 is below the pressure threshold and configured to be pushed away from the second end 402 of the shaft 4 to communicate the first through hole 403 with the external environment when the internal pressure of the cavity 5 is above the pressure threshold.

In some embodiments, to fix the second sealing element 62 at the second end 402 of the shaft 4, the sealing mechanism 6 further includes a second base element 63 configured to support the second sealing element 62. As shown in FIGS. 15 and 16, the second base element 63 includes a second mounting pillar 632 and a pair of mounting parts 631. The mounting parts 631 are coupled to the pulley 70. The second mounting pillar 632 is inserted into the mounting hole 623 of the second sealing element 62 to fix the supporting part 621 of the second sealing element 62, such that the second sealing element 62 is positioned at the second end 402 of the shaft 4.

In an embodiment, as shown in FIG. 14, the harmonic reducer 100 further includes a third base element 72 arranged at the first end 401 of the shaft 4. The construction of the third base element 72 is similar to that of the base element 60 as shown in FIG. 7. It is to be understood that in other embodiments, the third base element 72 may be removed, as that shown in FIGS. 1 and 2.

In embodiments described above with reference to FIGS. 1-16, the first end 401 of the shaft 4 is arranged near to the first flange 21 and the cavity 5 is provided between the first flange 21 and the first end 401 of the shaft 4. However, it is to be understood that in other embodiments, the first end 401 of the shaft 4 may be arranged inside the harmonic reducer 100 near to the second flange 22, and the cavity 5 is provided between the second flange 22 and the first end 401 of the shaft 4. In these cases, the sealing mechanism 6 and other arrangements as described above is also applicable. For example, the sealing mechanism 6 as described above with reference to FIGS. 3-13 may be arranged in the cavity 5 near to the second flange 22, and the sealing mechanism 6 as described above with reference to FIGS. 14-16 may be arranged at the second end 402 of the shaft 4 near to the first flange 21. Moreover, the pulley 70 may be arranged at the second end 402 of the shaft 4 near to the first flange 21.

According to embodiments of the present disclosure, the harmonic reducer 100 may be used in various devices or machines, such as industrial robots, electric tools, and automobiles. For example, the harmonic reducer 100 may be used for driving a joint of an industrial robot.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:
1. A harmonic reducer comprising:
a shaft comprising a first through hole extending from a first end to a second end of the shaft in an axial direction of the shaft;
a porous material arranged in the first through hole;

a wave generator arranged on the shaft and being rotatable along with the shaft;
a flexible spline arranged around the wave generator;
a circular spline arranged around the flexible spline;
a first flange coupled to the shaft via a first bearing and coupled to the flexible spline; and
a second flange coupled to the shaft via a second bearing and coupled to the circular spline,
wherein one of the first flange and the second flange is arranged near to the first end of the shaft, and
wherein a cavity is provided between the one of the first flange and the second flange and the first end of the shaft, and is in fluid communication with an external environment via the first through hole.

2. The harmonic reducer according to claim 1, further comprising a sealing mechanism configured to selectively allow the cavity to be in fluid communication with the external environment via the first through hole in accordance with an internal pressure of the cavity.

3. The harmonic reducer according to claim 2, wherein the sealing mechanism comprises:
a base element coupled to the first end of the shaft and comprising a second through hole in fluid communication with the first through hole;
a first sealing element arranged on the base element and comprising one or more openings and a sealing surface surrounding the one or more openings, the one or more openings being configured to communicate the cavity with the second through hole; and
a second sealing element arranged between the first sealing element and the base element, and comprising an elastic sealing lip configured to contact the sealing surface of the first sealing element to block the fluid communication between the cavity and the second through hole when the internal pressure of the cavity is below a pressure threshold and configured to be pushed away from the sealing surface of the first sealing element to communicate the cavity with the second through hole when the internal pressure of the cavity is above the pressure threshold.

4. The harmonic reducer according to claim 3, wherein the base element comprises:
a mounting part inserted into the first through hole at the first end of the shaft, the second through hole being provided on the mounting part; and
a receiving part comprising a first receiving space, a second receiving space, and a step between the first receiving space and the second receiving space, the second receiving space being closer to the mounting part than the first receiving space.

5. The harmonic reducer according to claim 4, wherein the first sealing element further comprises:
a sealing part arranged in the first receiving space and supported by the step, the one or more openings and the sealing surface being provided on the sealing part; and
a mounting pillar coupled to the sealing part and configured to mount the second sealing element.

6. The harmonic reducer according to claim 5, wherein the second sealing element further comprises:
a supporting part configured to support the elastic sealing lip and comprising a mounting hole into which the mounting pillar of the first sealing element is inserted.

7. The harmonic reducer according to claim 3, wherein the base element further comprises a groove at its outer surface.

8. An industrial robot comprising a harmonic reducer according to claim 3.

9. The harmonic reducer according to claim 2, wherein the sealing mechanism comprises:
a second sealing element arranged at the second end of the shaft and comprising an elastic sealing lip configured to contact the second end of the shaft to block the fluid communication between the first through hole and the external environment when the internal pressure of the cavity is below a pressure threshold and configured to be pushed away from the second end of the shaft to communicate the first through hole with the external environment when the internal pressure of the cavity is above the pressure threshold.

10. The harmonic reducer according to claim 9, wherein the second sealing element further comprises:
a supporting part configured to support the elastic sealing lip and comprising a mounting hole.

11. The harmonic reducer according to claim 10, further comprising a pulley arranged on the shaft near to the second end of the shaft and being rotatable together with the shaft, wherein the sealing mechanism further comprises a second base element configured to support the second sealing element and comprising:
a pair of mounting parts coupled to the pulley; and
a second mounting pillar inserted into the mounting hole of the second sealing element to fix the supporting part of the second sealing element.

12. An industrial robot comprising a harmonic reducer according to claim 2.

13. The harmonic reducer according to claim 1, further comprising one or more channels arranged between the one of the first flange and the second flange and corresponding one of the first bearing and the second bearing.

14. The harmonic reducer according to claim 13, further comprising a bearing sleeve arranged around the corresponding one of the first bearing and the second bearing.

15. An industrial robot comprising a harmonic reducer according to claim 13.

16. The harmonic reducer according to claim 1, further comprising:
a cross roller bearing comprising an outer ring coupled to the flexible spline and an inner ring coupled to the circular spline.

17. An industrial robot comprising a harmonic reducer according to claim 16.

18. An industrial robot comprising a harmonic reducer according to claim 1.

* * * * *